United States Patent
Meiller et al.

[11] Patent Number: 5,505,521
[45] Date of Patent: Apr. 9, 1996

[54] SPRUNG SEAT FRAME

[75] Inventors: Hermann Meiller, Amberg; Josef Hoerner, Regensburg, both of Germany

[73] Assignee: Grammer AG, Amberg, Germany

[21] Appl. No.: 227,249

[22] Filed: Apr. 13, 1994

[30] Foreign Application Priority Data

May 6, 1993 [DE] Germany .......................... 43 14 975.8

[51] Int. Cl.⁶ .............................. A47C 1/02; B60N 2/02
[52] U.S. Cl. .................................. 297/302.1; 248/372.1; 267/160; 297/303.1; 297/311; 297/325
[58] Field of Search .................... 297/302.1, 303.1, 297/308, 311–313, 325, 337, 338, 344.1; 248/143, 372.1, 581, 617; 267/41, 160, 242

[56] References Cited

U.S. PATENT DOCUMENTS

| | | | |
|---|---|---|---|
| 1,962,464 | 6/1934 | Richsteig | 297/302 X |
| 2,101,422 | 12/1937 | Assalit | 297/302 |
| 2,313,559 | 3/1943 | Larsen et al. | 297/302 |
| 2,586,951 | 2/1952 | Johnson | 297/302 X |
| 2,641,307 | 6/1953 | McKinney et al. | |
| 4,889,385 | 12/1989 | Chadwick et al. | 297/304 X |

FOREIGN PATENT DOCUMENTS

| | | |
|---|---|---|
| 626527 | 3/1929 | France . |
| 768496 | 8/1934 | France . |
| 672258 | 2/1939 | Germany . |
| 837965 | 3/1952 | Germany . |
| 915898 | 7/1954 | Germany .............................. 297/302 |
| 1794562 | 8/1959 | Germany . |
| 3042604 | 4/1986 | Germany . |

Primary Examiner—Peter R. Brown
Attorney, Agent, or Firm—Elliot M. Olstein; Raymond J. Lillie

[57] ABSTRACT

A sprung seat frame comprises a base element, a top element and a spring arrangement between the base and top elements. The spring arrangement has at least two leaf springs which are arranged one above the other at a spacing from each other and at least approximately parallel to each other. One end portion of each leaf spring is connected to the base element and the second end portion of each leaf spring is connected to the top element. The leaf springs are disposed obliquely inclinedly between the base and top elements. At least one corrector leaf spring which is oriented at least approximately parallel to the leaf springs and which is shorter than same is additionally operatively disposed between the base and top elements for optimizing the springing characteristic of the seat frame.

12 Claims, 3 Drawing Sheets

SPRUNG SEAT FRAME

BACKGROUND OF THE INVENTION

One form of sprung seat frame, for example for a vehicle seat, as disclosed for example in U.S. Pat. No. 2,641,307, has a base element, which for example can be fixed to a vehicle floor structure, a top element which forms the upper component of the seat frame structure, and a spring arrangement which is operatively disposed between the base element and the top element. The spring arrangement comprises in superposed relationship at least two leaf springs which are disposed at a spacing from each other and which are at least approximately parallel to each other. The leaf springs are fixed with their one end portion to the base element while the second end portion thereof is fixed to the top element. In the non-loaded condition of the seat frame the leaf springs extend obliquely inclinedly between the base and top elements. The seat frame structure also includes coil springs which connect the end portions of the leaf springs, which are remote from the base element, to each other and to the top element on which the seating member of the seat in which the seat frame is used is disposed. A further coil spring is provided at a central portion between the leaf springs.

It will be seen therefore that this seat frame structure involves a considerable number of individual components, and that has an effect on the assembly and installation particularities of the seat frame. Furthermore that seat frame has only a single precisely defined springing characteristic which cannot be adjusted according to user requirements.

In another form of sprung seat frame or sprung seat which is intended more specifically for a tractor or traction engine, as is found in DE-C-837 965, a lower leaf spring forming part of a spring arrangement disposed between the base element and the top element of the seat frame structure is composed of two leaf spring portions, wherein one leaf spring portion is fixedly connected to the upper leaf spring of the spring arrangement and the second leaf spring portion is of a corrugated configuration and bears movably against the upper leaf spring. That seat frame provides a given constant springing characteristic in dependence on the choice and dimensioning of the spaced-apart leaf springs which are thus disposed one above the other.

Another form of sprung seat having two curved leaf springs which are disposed in side-by-side relationship, as is to be found in FR-A-768 496, also has a given constant springing characteristic. However manufacture of the leaf springs of that seat and more specifically the shaping thereof involves a not inconsiderable amount of work and the aspect of reproducibility also gives rise to problems with the leaf springs of the configuration used therein.

A vehicle seat as disclosed in DE-U-1 794 562 has spring elements which are formed in particular by rubber elements. The rubber elements can be disposed between the seat and strip elements which are angled in a Z-shape and which can also be of a resilient nature. That design configuration also provides a specific constant springing characteristic, as is also the case with a seat frame as disclosed in FR-A-33 758, which is of a very simple design structure.

A similar kind of seat frame in which a spring arrangement comprises two leaf springs disposed at a spacing from each other in side-by-side relationship between the base element of the seat frame and a top element thereof is to be found in DE-C-672 258. The same considerations as set forth in relation to the above-discussed seat frames also apply in regard to the springing characteristic of this seat frame.

SUMMARY OF THE INVENTION

An object of the present invention is to provide a sprung seat frame which can provide an optimum springing characteristic.

Another object of the present invention is to provide a sprung seat frame, for example for a vehicle seat, which does not involve components which move in relative frictional engagement with each other.

Still another object of the present invention is to provide a sprung seat frame, more especially for a vehicle seat, which can afford a comfortable springing characteristic that can be adjusted according to user wishes, while nonetheless being of simple design configuration.

In accordance with the principles of the present invention the foregoing and other objects are achieved by a sprung seat frame, for example for a vehicle seat, comprising a base means, a top means constituting an upper component of the seat frame, and a spring means disposed between the base means and the top means. The spring means comprises in mutually superposed relationship at least first and second leaf springs which are spaced from each other and at least approximately parallel to each other. The leaf springs are secured with their one end portion to the base means and with their second end portion to the top means. In the non-loaded condition of the seat frame the leaf springs are disposed obliquely inclinedly between the base means and the top means of the seat frame. In addition to the at least first and second leaf-springs the seat frame includes at least one corrector leaf spring which is shorter than the said first and second leaf springs and which is oriented at least approximately parallel thereto. Curved in a semi-sinusoidal configuration in the non-loaded condition of the seat frame, the corrector leaf spring is fixed with one end portion to a corrector fixing device while its second end portion is fixed to a fixing device for fixing the adjoining end portions of the first and second leaf springs on the base means or the top means.

As will be seen in greater detail hereinafter from the description of preferred embodiments of the present invention, the seat frame according to the invention makes it possible to provide a relatively soft and comfortable springing characteristic within a given springing range even when the springing characteristic of the at least first and second mutually parallel leaf springs, when considered in itself, is comparatively hard. It will be seen that the hard springing characteristic of the mutually parallel leaf springs co-operates with the corrector leaf spring in such a way as to provide overall a relatively soft springing characteristic.

In accordance with a preferred feature of the invention the corrector fixing device for mounting the first end portion of the or each corrector leaf spring is disposed on the base means while the second end portion of the or each corrector leaf spring is disposed at a second fixing device carried by the top means.

Another preferred feature of the invention provides that the semi-sinusoidal curvature of the at least one corrector leaf spring is adjustable, between the two end portions thereof, by virtue of an adjusting means. That makes it possible to adjust a desired springing characteristic of the seat frame according to the invention, in accordance with user wishes.

The adjusting means may be provided at the corrector leaf spring fixing device.

In accordance with another preferred feature of the invention, a first fixing device is provided for fixing the at least first and second leaf springs on the base means and a second fixing device is provided for fixing the at least first and second leaf springs on the top means. The first and second fixing devices may be for example of a simple block-like configuration so that the respective leaf springs can be suitably fixed therein, by way of their respective end portions.

In accordance with a further desirable feature of the invention however it is also possible for the first and/or second fixing devices to be provided with an adjusting means for adjusting a given curvature of the associated end portion of a corresponding leaf spring. This also makes it possible to adjust the springing characteristics of the sprung seat frame, as desired, for example to provide for an adjustment according to weight.

In accordance with another preferred feature of the invention the base means and/or the top means may be provided with at least one contact or bearing member for the respectively associated leaf spring to bear thereagainst, thereby to make it possible to adjust the desired springing characteristics. The at least one contact or bearing member may be for example of a cam-like configuration.

In a further configuration of that arrangement the or each contact member for the respectively associated leaf spring may be displaceable relative to the associated base means or top means. That can provide for fine adjustment of a desired springing characteristic.

Further objects, features and advantages of the present invention will be apparent from the following description of preferred embodiments thereof.

DESCRIPTION OF PREFERRED EMBODIMENTS

Figure 1:
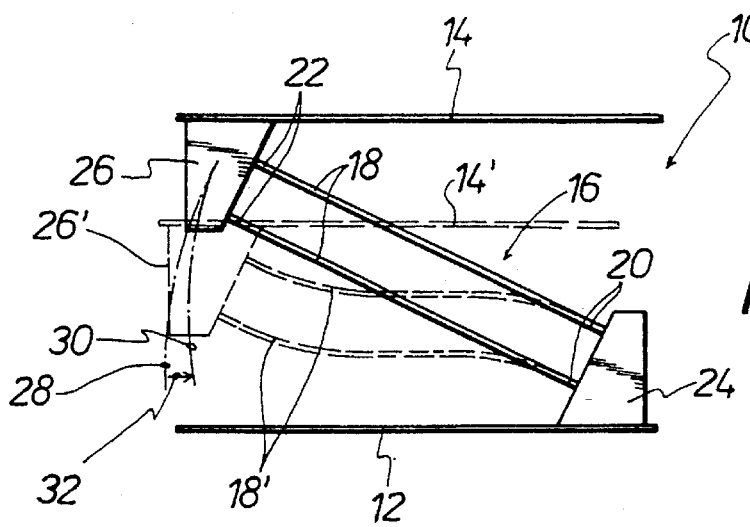
FIG. 1 is a side view of a first embodiment of the sprung seat frame without illustration of the corrector leaf spring.

Referring firstly to FIG. 1, shown therein is a side view of a sprung seat frame 10, intended more particularly for a vehicle seat. The seat frame 10 comprises a base element 12 which for example can be fixed to a vehicle floor structure, and a top element 14 constituting the upper component of the seat frame structure and intended for example to receive a seat squab or cushion. Disposed between the base element 12 and the top element 14 is a spring arrangement 16 so that the top element 14 can perform a springy generally pivotal movement relative to the base element 12. The base element 12 and the top element 14 can each be of a plate-like or frame-like configuration.

The spring arrangement has first and second leaf springs 18 which are disposed at a spacing from each other and at least approximately parallel to each other. Each leaf spring 18 has a first end portion 20 and a second end portion 22. The first end portions 20 of the leaf springs 18 are mounted to a first fixing device 24 and the second end portions 22 are mounted to a second fixing device 26. In the illustrated embodiment in FIG. 1 the first fixing device 24 is disposed on the base element 12 and the second fixing device 26 is disposed on the top element 14. It will be clearly seen that the leaf springs 18 are disposed in superposed relationship.

FIG. 1 shows the sprung seat frame in the non-loaded condition in solid lines and in a loaded condition in thin broken lines, in order to make it clear that, in the case of the seat frame 10 according to the invention, the amount of space required as viewed in plan in the loaded condition is smaller by a factor of the order of magnitude of 0.8 than in the case of a seat frame comprising scissor arm assemblies in which the scissor arms pivot about pivot points. That reduction in the amount of space required is indicated in FIG. 1 by the dash-dotted arcs 28 and 30 and the arrow 32 indicating the difference between the arcs 28 and 30. In FIG. 1 the dash-dotted arc 28 is formed by a circular line around the first fixing device 24 while the dash-dotted arc 30 results from the S-shaped curvature of the two leaf springs 18 when the seat frame 10 is in the loaded condition, with the two end portions 20 and 22 of the two leaf springs 18 remaining fixed in the respective fixing devices 24 and 26, that is to say, they project away from the fixing devices 24 and 26 unchanged in the same direction. In FIG. 1, the top element is denoted by reference numeral 14' in the loaded condition of the seat frame 10 and the two mutually parallel leaf springs are similarly denoted by reference numeral 18', in order clearly to show the deviation of the leaf springs 18 from their position when the seat frame 10 is in the non-loaded condition, more specifically being the position in which the leaf springs 18 are disposed obliquely inclinedly between the base element 12 and the top element 14. Reference numeral 26' in FIG. 1 similarly denotes the second fixing device of the seat frame 10 when the seat is in the loaded condition.

Figure 2:
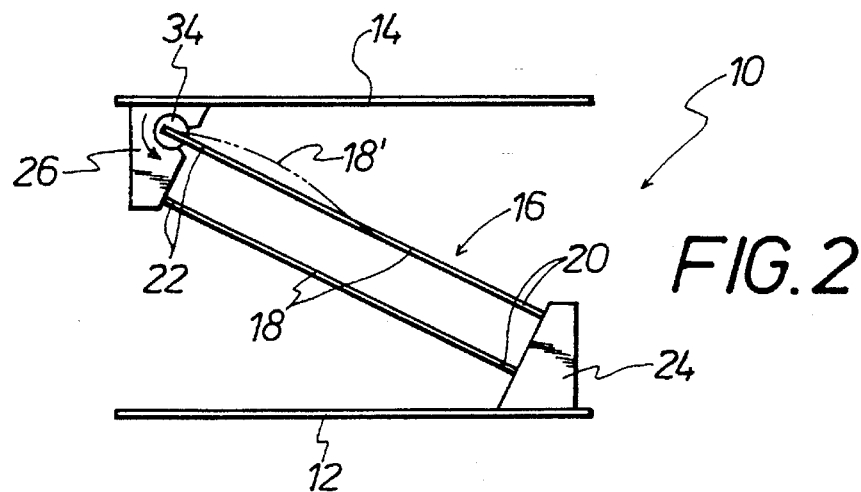
FIG. 2 is a side view of a second embodiment of the sprung seat frame, again without the corrector leaf spring.

Referring now to FIG. 2, shown therein is a similar side view of a seat frame 10 which differs from the embodiment illustrated in FIG. 1 insofar as in this case the second fixing device 26 which is carried on the top means 14 is provided with an adjusting device 34 with which it is possible to provide for adjustment as desired of the curvature of the associated end portion 22 of the corresponding leaf spring 18 which in this embodiment is the upper leaf spring. It will be appreciated that it would also be possible for the fixing device 24 on the base element 12 to be provided with an adjusting device 34. Reference numeral 18' in FIG. 2 denotes the leaf spring with its correspondingly modified curvature, such curvature permitting mechanical prestressing of the spring arrangement 16 formed by the leaf springs 18 and thus adjustment of the seat frame 10, according to user weight.

It will be appreciated that the same components are identified by the same reference numerals in FIGS. 1 and 2 so that there is no need for all thereof to be described in detail once again in relation to FIG. 2.

Figure 3:
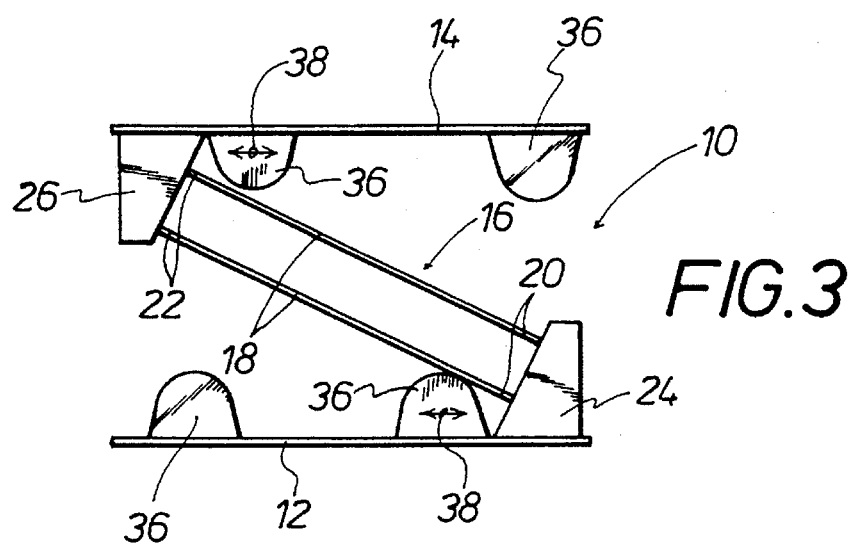
FIG. 3 is a side view of a third embodiment of the sprung seat frame, again without the corrector leaf spring.

FIG. 3 shows another embodiment of the sprung seat frame 10 in which the base element 12 and the top element 14 are each provided with contact or bearing members 36. It will be appreciated that it is also possible for only the base element 12 or only the top element 14 to be provided with at least one associated contact member 36. By means of the or each contact member 36 it is possible to adjust the springing characteristic of the spring arrangement formed by the mutually parallel leaf springs 18, as required, if contact members 36 are for example arranged displaceably on the base element 12 and/or the top element 14. Such displaceability is indicated in FIG. 3 by the double-headed arrows 38.

It will be appreciated once again that the same components are identified by the same reference numerals in FIG. 3 as in FIGS. 1 and 2 so that there is no need for all such components to be described here once again in detail in relation to FIG. 3. It will be further appreciated, as indicated above, that FIGS. 1, 2 and 3 do not show the at least one corrector leaf spring of the seat frame according to the invention, which is indicated at reference numeral 40 in FIG. 4, for the sake of clarity of the drawing.

Figure 4:
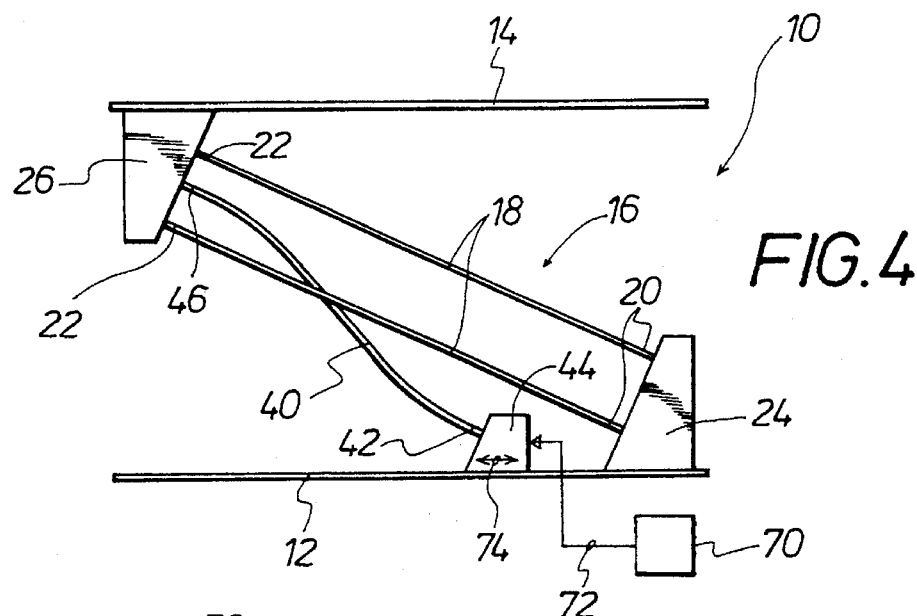
FIG. 4 is a side view of a fourth embodiment of the sprung seat frame but now including an illustration of the corrector leaf spring.

Referring therefore now to FIG. 4, shown therein is an embodiment of the sprung seat frame 10 with the at least first and second leaf springs 18 which are disposed in superposed relationship at a spacing from each other and at least approximately parallel to each other between the base element 12 and the top element 14, thus forming the spring arrangement 16 which is operatively disposed between the base and top elements 12 and 14. The leaf springs 18 are fixed with their end portions 20 and 22 to first and second fixing devices 24 and 26 respectively. FIG. 4 additionally shows the at least one corrector leaf spring 40 which is fixed with its one end portion 42 to a corrector fixing device 44 and with its second end portion 46 to one of the fixing devices 24 and 26. In the embodiment illustrated in FIG. 4, the second end portion 46 of the at least one corrector leaf spring 40 is fixed to the fixing device 26 provided on the top element 14, and the corrector fixing device 44 is disposed on the base element 12. It would alternatively be possible however for the corrector fixing device to be provided on the top element 14, in which case the other end of the at least one corrector leaf spring 40 would be fixed to the fixing device 24 on the base element 12.

In the non-loaded condition of the seat frame 10, the corrector leaf spring 40 is curved in a semi-sinusoidal configuration. While therefore the at least one corrector leaf spring is oriented at least approximately parallel to the leaf springs 18, it is shorter than the mutually parallel leaf springs 18 so that, within a given springing range, the seat frame structure 10 affords a springing characteristic which is relatively soft in comparison with the springing characteristics of the leaf springs 18, as will be clearly apparent hereinafter from consideration of FIGS. 5 and 6.

Figure 5:
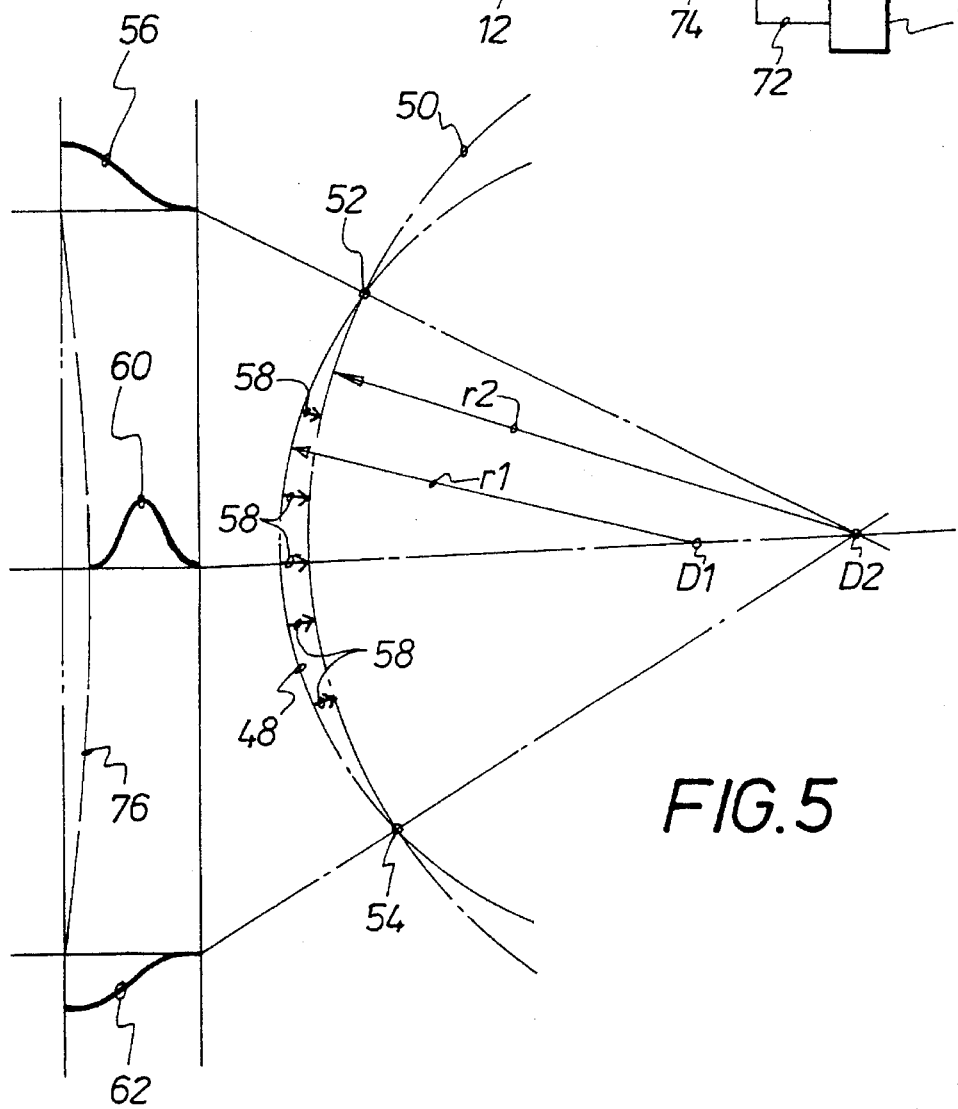
FIG. 5 is a diagram showing the principle of the mode of operation of the sprung seat frame illustrated in FIG. 4, in particular also to show the mode of operation of the at least one corrector leaf spring and the co-operation of the leaf springs with the at least one corrector leaf spring.

Looking therefore now at FIG. 5, shown therein as a diagrammatic representation is the movement of the second end portion 46 of the corrector leaf spring 40 about the pivot point D1, such movement being indicated by the dash-dotted circular arc 48. The pivot point D1 is determined by the corrector fixing device 44 carried on the base element 12. The radius r1 in FIG. 5 corresponds to the spacing between the corrector fixing device 44, or the first end portion 42 of the corrector leaf spring 40, and its second end portion 46 which is fixed to the second fixing device 26 on the top element 14. In FIG. 5, D2 denotes the pivot point about which approximately the second fixing device indicated at 26 in FIG. 4 performs an arcuate movement around the first fixing device 24 on the base element 12, when the seat frame 10 is correspondingly loaded. The pivot point D2 is consequently defined by the first fixing device 24 on the base element 12. The arcuate movement of the second fixing device about the pivot point D2 or the first fixing device 24 is indicated by the dash-dotted arc 50 in FIG. 5. As has been already indicated above, that arc 50 is not a circular arc but is curved corresponding to the arc indicated at 30 in FIG. 1. The two dash-dotted arcs 48 and 50 consequently intersect at two points 52 and 54. At point 52, that is to say when the seat frame 10 is in the non-loaded condition, the corrector leaf spring 40 is curved in a semi-sinusoidal configuration, which is indicated by the curve 56 at the left-hand side of FIG. 5. When the seat frame 10 is correspondingly loaded, that gives rise to a movement of the top element 14 and thus of the second fixing device 26 along the dash-dotted arc indicated at 50 in FIG. 5, which means that the second end portion 46 of the corrector leaf spring 40, which is gripped in the second fixing device 26, is correspondingly upset, as is indicated in FIG. 5 by the arrows 58 and by the curved line 76. Accordingly, in the middle position of the corrector leaf spring 40 between the two points of intersection 52 and 54, instead of the corrector leaf spring 40 being curved in a semi-sinusoidal configuration, it adopts a shortened sinusoidal configuration which is indicated by the curve 60 at the left-hand side in FIG. 5. If then the seat frame 10 is still further loaded, that involves a movement towards the point of intersection 54, that is to say a reversal in the upsetting of the corrector leaf spring 40 so that the corrector leaf spring 40 is of a reversed, semi-sinusoidal curvature which is again correspondingly longer, as indicated by the curve 62 on the left-hand side in FIG. 5.

Figure 6:
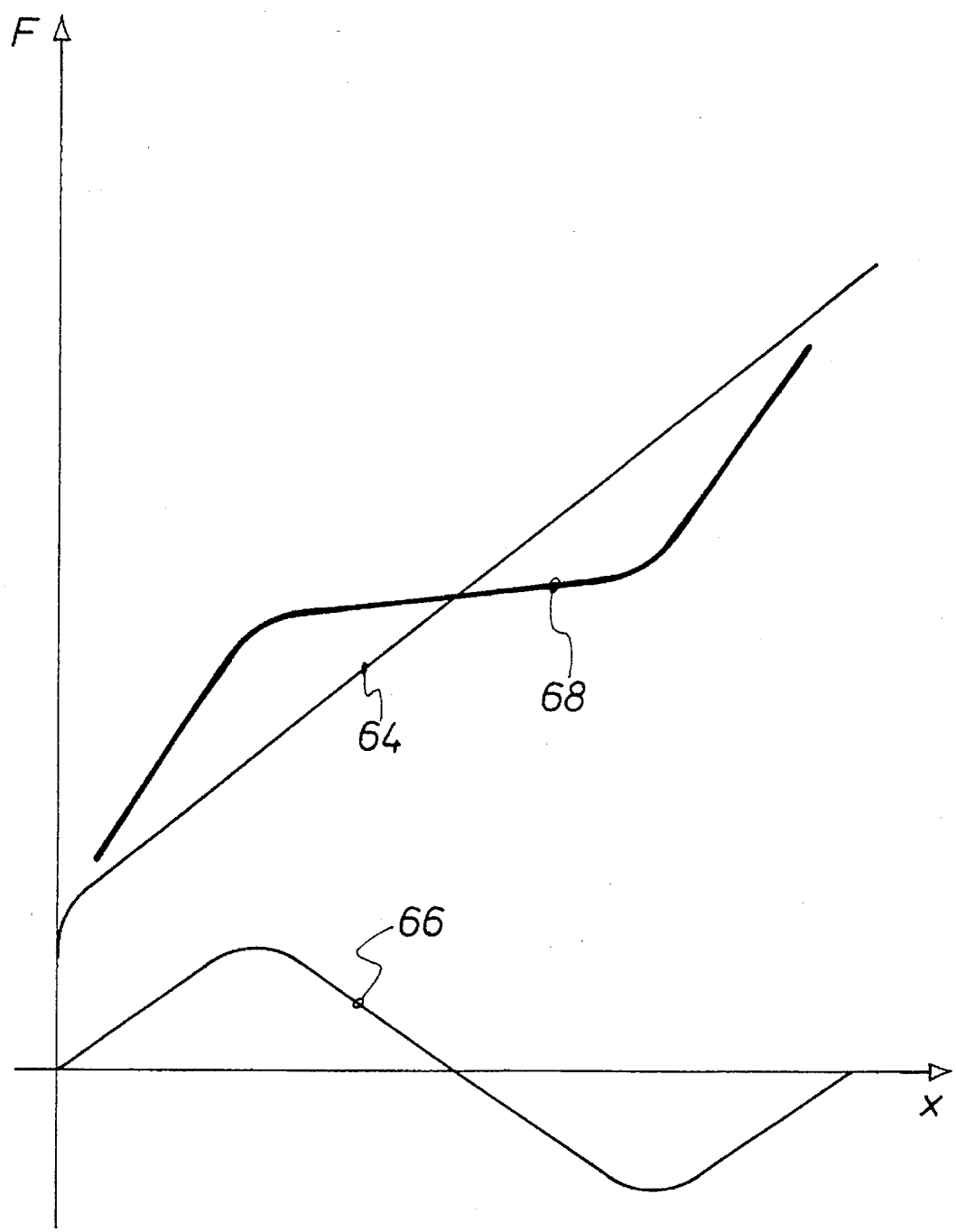
FIG. 6 is a graph showing the springing characteristic of the sprung seat frame shown in FIG. 4.

In the graph shown in FIG. 6, plotting deflection x against spring force F, that means that the springing characteristic of the leaf springs 18, as indicated by the line 64, has, superposed thereon, the springing characteristic of the corrector leaf spring, which changes its direction as indicated by the curve 66. That superimposition of the springing characteristic of the corrector leaf spring on the springing characteristic of the leaf springs 18 results in an overall springing characteristic as indicated by the curve 68. It can be seen therefrom that, over a wide deflection range, the seat frame according to the invent ion provides a considerably softer springing characteristic than would correspond to the springing characteristic of the mutually parallel spaced-apart leaf springs 18 alone.

Reference will now again be made to FIG. 4 which further shows an adjusting device diagrammatically indicated at 70 which is operatively connected to the corrector fixing device 44, as indicated by the arrow 72. By means of the adjusting device 70, it is possible to adjust the semi-sinusoidal curvature of the corrector leaf spring 40 between its two end portions 42, 44 so that the springing characteristic of the seat frame 10 can be varied as desired. In that arrangement, that adjustment of the semi-sinusoidal curvature of the corrector leaf spring 40 is effected for example by displacement of the corrector fixing device 44 on the base element 12, as is indicated by the double-headed arrow 74 in FIG. 4.

It will be seen therefore that the seat frame according to the invention is easily adjustable to correspond to the weight of the user of the seat of which the seat frame forms a part, by virtue of the adjustability of its springing characteristics. Weight adjustment can be carried out in a quick and easy fashion and without involving complicated operations. It is also possible for the seat frame according to the invention to be easily electrified, that is to say equipped with an electrically operated actuating system, in order to provide a seat frame with a high level of operator comfort. Further advantages of the seat frame according to the invention lie in the simple, robust structure of the seat frame and in its negligibly low rate of wear of the components thereof.

It will be appreciated that the above-described seat frame according to the invention has been set forth solely by way of example and illustration of the principles of the invention and that various modifications and alterations may be made therein without thereby departing from the spirit and scope of the invention.

We claim:

1. A sprung seat frame comprising: a base means; a top means; and a spring means operatively disposed between the base means and the top means and including at least first and second leaf springs disposed in superposed relationship at a spacing from each other and at least approximately parallel to each other, each leaf spring having first and second end portions and being mounted with their one end portion to the base means and with their other end portion to the top means and in the non-loaded condition of the seat frame being disposed obliquely inclinedly between the base means and the top means, and further including in addition to the at least first and second leaf springs at least one corrector leaf spring having first and second end portions, and a corrector fixing means on one of the base means and the top means, one of the end portions of the corrector leaf spring being connected to the corrector fixing means and the other end portion of the corrector leaf spring being connected to the other of the base means and the top means, the corrector leaf spring extending obliquely with the first and second leaf springs and being shorter than same and being curved in a semi-sinusoidal configuration in the non-loaded condition of the seat frame.

2. A seat frame as set forth in claim 1 wherein the corrector fixing means is carried on said base means and wherein said other end portion of the corrector leaf spring is connected to the top means.

3. A seat frame as set forth in claim 1 including an adjusting means provided at said corrector fixing means for adjustment of the semi-sinusoidal curvature of the at least one corrector leaf spring between the end portions thereof, thereby to provide for adjustment as desired of a given springing characteristic of the seat frame.

4. A seat frame as set forth in claim 1 including a first fixing means carried by said base means for connecting said at least first and second leaf springs to said base means and a second fixing means carried by said top means for connecting said at least first and second leaf springs to said top means, said first fixing means and said second fixing means being attached to the respective first and second end portions of said first and second leaf springs.

5. A seat frame as set forth in claim 4 wherein said other end of said at least one corrector leaf spring is mounted to said second fixing means.

6. A seat frame as set forth in claim 4 wherein at least one of said first and second fixing means includes an adjusting means for adjusting the curvature of the associated end portion of a corresponding leaf spring.

7. A seat frame as set forth in claim 1 wherein at least one of said base means and said top means includes at least one contact means for contact of the respectively associated leaf spring.

8. A seat frame as set forth in claim 7 including means for displacement of said at least one contact member relative to the associated one of the base means and top means.

9. A sprung seat frame comprising: a base means; a first fixing means on the base means; a top means; a second fixing means on the top means; a spring means operatively disposed between the base means and the top means and including first and second leaf springs in superposed relationship at a spacing from each other and at least approximately parallel to each other, each leaf spring having first and second end portions and having one end portion connected to said first fixing means and their other end portion connected to the second fixing means and in the non-loaded condition of the seat frame extending inclinedly between the base means and the top means; a corrector fixing means on one of said base means and top means; a corrector leaf spring having first and second end portions and being shorter than said first and second leaf springs, one of said end portions of said corrector leaf spring being connected to said corrector fixing means; and a mounting means on the other of said base means and top means, the other end portion of said corrector leaf spring being connected to said mounting means, whereby said corrector leaf spring extends obliquely with the first and second leaf springs and curves in a semi-sinusoidal configuration in the non-loaded condition of the seat frame.

10. A seat frame as set forth in claim 9 wherein said mounting means for said other end portion of said corrector leaf spring is one of said first and second fixing means.

11. A seat frame as set forth in claim 10 wherein said mounting means is said second fixing means.

12. A vehicle seat having a spring seat frame comprising: a base means; a top means; and a spring means operatively disposed between the base means and the top means and including at least first and second leaf springs disposed in superposed relationship at a spacing from each other and at least approximately parallel to each other, each leaf spring having first and second end portions and being mounted with their one end portion to the base means and with their other end portion to the top means and in the non-loaded condition of the seat frame being disposed obliquely inclinedly between the base means and the top means, and further including in addition to the at least first and second leaf springs at least one corrector leaf spring having first and second end portions, and a corrector fixing means on one of the base means and the top means, one of the end portions of the corrector leaf spring being connected to the corrector fixing means and the other end portion of the corrector leaf spring being connected to the other of the base means and the top means, the corrector leaf spring extending obliquely with the first and second leaf springs and being shorter than same and being curved in a semi-sinusoidal configuration in the non-loaded condition of the seat frame.

* * * * *